Patented July 24, 1934

1,967,264

UNITED STATES PATENT OFFICE 1,967,264

RECOVERY OF SULPHUR

Ludwig Rosenstein, San Francisco, Calif., assignor to United Verde Copper Company, a corporation of Delaware No Drawing. Application November 28, 1930, Serial No. 498,754

3 Claims. (Cl. 23—181)

This invention relates to the recovery of sulphur from gases containing sulphur dioxide. More particularly, the invention contemplates the provision of an improved process for recovering sulphur in the form of hydrogen sulphide from gases containing sulphur dioxide. The invention further contemplates the provision of an improved process for recovering elemental sulphur involving the reduction of sulphur dioxide to hydrogen sulphide.

The present invention is based on my discovery that a reaction between sulphur dioxide and a hydrocarbon when conducted in the presence of suitable contact agents at elevated temperatures may be so controlled as to result in only a partial oxidation of the hydrocarbon and substantially complete reduction of the sulphur dioxide to hydrogen sulphide. I have found metal sulphides such, for example, as manganese sulphide and sulphides of the alkaline-earth metals or mixtures of these to be particularly suitable for use as contact agents.

While metal sulphides prepared in any suitable manner may be employed, I have found that highly satisfactory results may be obtained when reaction products resulting from reducing operations involving the treatment of the metal sulphates with reducing agents at elevated temperatures are employed. Thus, for example, I prefer to employ as a contact agent a reaction product resulting from the treatment of calcium sulphate, magnesium sulphate, barium sulphate or manganese sulphate with a carbonaceous reducing agent at a temperature in excess of about 600° C. for a sufficiently long period of time to insure substantially complete reduction of the sulphate to the sulphide. While the product resulting from the aforementioned type of treatment is probably largely a metal sulphide, my experience indicates that it probably contains other components which are instrumental in promoting a reaction between sulphur dioxide and a hydrocarbon to produce hydrogen sulphide, or, its physical structure is such as to increase the efficiency of the sulphide as a contact agent for promoting the reaction. I have found that the efficiency of the sulphide reaction product improves with use.

In preparing the contact agents for use in the process of my invention, I have obtained the metal sulphides by reducing the corresponding sulphates with hydrocarbons. Thus, for example, in preparing a contact agent containing calcium sulphide, I first dehydrate gypsum $CaSO_4.2H_2O$ by heating the gypsum in the form of lumps or cylinders of suitable sizes and in a suitably enclosed vessel to a temperature of about 300° C. while passing a gas in contact with the mass of material. The heating is continued until the gases issuing from the vessel are substantially free from water vapor. The dehydrated product is then subjected to the action of a hydrocarbon at a temperature in excess of about 600° C. for a sufficiently long period to effect a substantially complete reduction of the calcium sulphate to calcium sulphide.

During the course of the dehydrating and reducing operations, the lumps or cylinders retain their original forms and shrink but very little in size. The removal of the water of hydration and oxygen during the dehydration operation without appreciable shrinkage in volume of the material undoubtedly results in the formation of a product having a porous structure, and since the product functions as a heterogeneous catalyst it is possible that its efficiency may be attributed at least in part to its physical structure.

The product of the reducing operation may be gray or pink in color or portions may be gray and other portions pink. I am unable at the present time to offer a satisfactory explanation for the differences in color, but I believe they are attributable to differences in physical structures and chemical compositions. At any rate, I have found that reduction products which are entirely gray in color are far more efficient contact agents than products which are pink in color. The superiority of the gray colored product is such that it is advisable to employ it, in preference to the pink product or a mixture of pink and gray products, in carrying out the process of the invention. Production of a gray product may be insured by suitable control of the reducing operation.

My conclusions with respect to the differences in the effectiveness of the products of different colors are based on observations made while carrying out processes involving the reduction of sulphur dioxide with natural gas containing methane in the presence of calcium sulphate reduction products for the purpose of reducing the sulphur dioxide substantially entirely to hydrogen sulphide. During the course of such operations, I noted that a calcium sulphide reduction product having a pink color was gradually changed to a product having a gray color and that when the product was substantially entirely gray in color large amounts of free hydrogen appeared in the gases with the hydrogen sulphide and oxides of carbon.

In preparing the contact agents for use in the process of my invention, the sulphate may be subjected to the action of a hydrocarbon reducing agent at a temperature in excess of about 600° C. until a reduction product having a uniform gray color is obtained. In order to insure the production of a gray product, it might be advisable to introduce sulphur dioxide into the reaction vessel with the reducing agent during the final stages of the reducing operation. In the event that this procedure is followed the proportions of reducing agent and sulphur dioxide should be such that a reducing atmosphere is maintained.

In order that a substantially complete conversion or reduction of the sulphur dioxide to hydrogen sulphide may be effected, the hydrocarbon should be supplied in such amount that the total hydrogen will be at least sufficient to combine with all the sulphur of the sulphur dioxide to form hydrogen sulphide, and the total carbon will be at least sufficient to combine with all the oxygen of the sulphur dioxide to form carbon dioxide. During the course of the reducing operation, small amounts of the sulphur dioxide may be reduced only to elemental sulphur with the result that some elemental sulphur will be present in the gaseous reduction product, but, when the operation is conducted under suitable conditions, the major portion of the sulphur dioxide will be reduced to hydrogen sulphide. The appearance of elemental sulphur in the gaseous reduction product will result largely from failure to supply an adequate amount of hydrocarbon, the allowance of insufficient time to complete the reduction, or failure to bring the reacting gases into a suitable reacting relationship. If for any reason it is desirable to obtain a gaseous reduction product containing some elemental sulphur, the desired result may be achieved by controlling the operation to establish any or all of the aforementioned conditions.

In producing hydrogen sulphide in accordance with the process of my invention, I prefer to form a mixture of gases containing sulphur dioxide and a hydrocarbon such, for example, as methane in such proportions as to react according to the following equation:—

(1) $4SO_2 + 3CH_4 = 3CO_2 + 4H_2S + 2H_2O$

The sulphur dioxide employed may be obtained from any suitable source. Thus, for example, sulphur dioxide may be obtained from furnace gases resulting from the smelting or roasting of sulphide ores. Furnace gases may be employed directly or the sulphur dioxide contained therein may be extracted to provide substantially pure sulphur dioxide gas or the sulphur dioxide may be transferred from the furnace gases to another body of gases in which it will be present in greater concentration than in the furnace gases. The reaction between the sulphur dioxide and hydrocarbon proceeds satisfactorily at temperatures in excess of about 700° C. but the use of temperatures of 800° C. to 850° C. insures a rapid and complete reaction.

The reaction between hydrocarbon and the sulphur dioxide is exothermic and when relatively pure gases are employed it will proceed indefinitely once it has been initiated. When gases containing sulphur dioxide in relatively small amounts are employed the heat of the reaction is dissipated by the carrier gases and it is necessary to employ additional heating means. Under such conditions heat may be supplied by including an excess of the hydrocarbon in the gas mixture together with sufficient oxygen to effect complete combustion of the excess hydrocarbon.

In carrying out a process in accordance with my invention, a catalyst such, for example, as one containing calcium sulphide is prepared by first dehydrating gypsum ($CaSO_4.2H_2O$) and then subjecting the dehydrated product to the action of a hydrocarbon gas at a temperature in excess of about 600° C. for a sufficient length of time to effect a substantially complete reduction of the sulphate to the sulphide. The gypsum is preferably cast in the form of lumps or small cylinders prior to subjecting it to the dehydrating operation. The reaction product of the reducing operation is placed in a suitable reaction chamber and so arranged that gases passing through the chamber will come into intimate contact therewith. If desired, the reaction chamber employed for carrying out the reaction between hydrocarbon and the sulphur dioxide may be used as the vessel in which the reduction of the sulphate is carried out.

In order to initiate the reaction, the contact mass is heated to a temperature of about 800° C. The mixture of gases containing sulphur dioxide and hydrocarbon or sulphur dioxide, hydrocarbon and oxygen, together with inert gases such as nitrogen, is then passed through the reaction chamber. The sulphur dioxide in passing through the reaction chamber in contact with the catalytic mass is reduced according to the reaction set forth in Equation (1). The reducing operation may be so controlled that substantially all of the sulphur dioxide is reduced to hydrogen sulphide and the gases issuing from the reaction chamber are substantially free from sulphur dioxide and elemental sulphur.

The gases issuing from the reaction chamber and containing hydrogen sulphide may be treated to utilize or recover the hydrogen sulphide contained therein. The gases may be used without further treatment, for example, to precipitate metals from solutions of their salts by passing the gases through the solutions, or, the gases may be subjected to the action of an agent capable of oxidizing the hydrogen sulphide contained therein to produce elemental sulphur.

I claim:—

1. A method of producing hydrogen sulphide which comprises subjecting sulphur dioxide to the action of an amount of hydrocarbon capable of providing at least two atoms of hydrogen for each atom of sulphur in the presence of manganese sulphide at an elevated temperature.

2. The method of producing hydrogen sulphide which comprises subjecting sulphur dioxide to the action of an amount of hydrocarbon capable of providing at least two atoms of hydrogen for each atom of sulphur at an elevated temperature in the presence of a product resulting from the treatment of manganese sulphate with a reducing agent at an elevated temperature.

3. The method of producing hydrogen sulphide which comprises subjecting sulphur dioxide to the action of a hydrocarbon at an elevated temperature in the presence of manganese sulphide to reduce the sulphur dioxide, and controlling the reducing operation to convert the major portion of the sulphur dioxide to hydrogen sulphide.

LUDWIG ROSENSTEIN.